United States Patent
Ross et al.

(10) Patent No.: US 9,465,837 B1
(45) Date of Patent: Oct. 11, 2016

(54) PROCESSING DATA REQUESTS FOR A SCHEMALESS DATASTORE IN ACCORDANCE WITH CONSTRAINT INFORMATION

(71) Applicant: Google Inc., Mountain View, CA (US)

(72) Inventors: Max C. Ross, Mountain View, CA (US); Alan Vincent Green, Penrith (AU)

(73) Assignee: GOOGLE INC., Mountain View, CA (US)

( * ) Notice: Subject to any disclaimer, the term of this patent is extended or adjusted under 35 U.S.C. 154(b) by 318 days.

(21) Appl. No.: 14/051,421

(22) Filed: Oct. 10, 2013

Related U.S. Application Data

(60) Provisional application No. 61/714,147, filed on Oct. 15, 2012.

(51) Int. Cl.
*G06F 17/30* (2006.01)

(52) U.S. Cl.
CPC .............. *G06F 17/30424* (2013.01)

(58) Field of Classification Search
CPC ............. G06F 17/30507; G06F 17/3051
See application file for complete search history.

(56) References Cited

U.S. PATENT DOCUMENTS

| | | | |
|---|---|---|---|
| 8,352,941 B1* | 1/2013 | Protopopov | G06F 9/45558 718/1 |
| 8,813,225 B1* | 8/2014 | Fuller | H04L 63/10 726/23 |
| 2009/0044271 A1* | 2/2009 | Benameur | G06F 21/31 726/22 |

* cited by examiner

*Primary Examiner* — Boris Gorney
*Assistant Examiner* — Kris Andersen
(74) *Attorney, Agent, or Firm* — Morgan, Lewis & Bockius LLP

(57) ABSTRACT

A server system having memory and one or more processors analyzes a first data request associated with a first application, where the analyzing includes determining whether the first data request is associated with a constraint-restricted portion of a schemaless datastore in which data operations are subject to a set of predefined constraints. In accordance with a determination that the first data request is associated with the constraint-restricted portion, the server system retrieves constraint information corresponding to the set of predefined constraints and processes the first data request in accordance with the constraint information, where the constraint information enables the set of predefined constraints to be applied to the first data request prior to execution of the first data request.

19 Claims, 11 Drawing Sheets

PROCESSING DATA REQUESTS FOR A SCHEMALESS DATASTORE IN ACCORDANCE WITH CONSTRAINT INFORMATION

RELATED APPLICATIONS

This application claims priority to U.S. Provisional Patent Application No. 61/714,147, filed Oct. 15, 2012, which is hereby incorporated by reference in its entirety.

BACKGROUND OF THE INVENTION

Applications are becoming increasingly data intensive. Creating infrastructure to manage large quantities of data in a distributed and efficient manner is complicated and time consuming. Schemaless datastores provide many advantages for efficiently storing and managing large quantities of data.

SUMMARY

Many conventional applications make use of the ability to impose constraints on read and write operations. However, many schemaless datastores do not provide application developers with the ability to impose predefined constraints on data operations performed at the schemaless datastore. Thus, it would be advantageous to provide a system and method for processing data requests at a schemaless datastore that imposes predefined constraints on the processing of the data requests. Additionally, in some situations multiple instances of an application run in parallel on one or more servers so as to provide additional bandwidth for handling requests from clients. Likewise, in some situations multiple different applications are associated with a particular domain, and a domain administrator may want to impose a set of constraints on all of the different applications associated with the domain. Thus, it would also be advantageous to provide an intuitive and flexible way for domain administrators and application developers to establish and manage predefined constraints that are to be applied to multiple instances of a particular application or to a set of different applications that are associated with a common domain. Specific embodiments for processing data requests at a schemaless datastore in accordance with predefined constraints are described in greater detail below.

In some embodiments, a method is performed at a respective server system having one or more processors and memory storing one or more programs for execution by the one or more processors so as to perform the method. The method includes analyzing a first data request associated with a first application, where the analyzing includes determining whether the first data request is associated with a constraint-restricted portion of a schemaless datastore and data operations in the constraint-restricted portion are subject to a set of predefined constraints. The method further includes, in accordance with a determination that the first data request is associated with the constraint-restricted portion, retrieving constraint information corresponding to the set of predefined constraints and processing the first data request in accordance with the constraint information. The constraint information enables the set of predefined constraints to be applied to the first data request prior to execution of the first data request. In some implementations, the constraints are applied to the first data request by a process running at the respective server system. In some implementations, the constraints are applied to the first data request by an untrusted process running in a sandboxed environment in another server system. In some implementations, the constraints are applied to the first data request by a trusted process running on another server system that is in communication with the schemaless datastore. In some implementations, the constraints are applied to the first data request by a process running at the schemaless datastore.

In accordance with some embodiments, a computer system (e.g., a client system, application server system or datastore server system) includes one or more processors, memory, and one or more programs; the one or more programs are stored in the memory and configured to be executed by the one or more processors and the one or more programs include instructions for performing the operations of one or more of the methods described above. In accordance with some embodiments, a non-transitory computer readable storage medium has stored therein instructions which when executed by one or more processors, cause a computer system (e.g., a client system, application server system or datastore server system) to perform the operations of one or more of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DESCRIPTION OF EMBODIMENTS

It will be understood that, although the terms "first," "second," etc. may be used herein to describe various elements, these elements should not be limited by these terms. These terms are only used to distinguish one element from another. For example, a first entity could be termed a second entity, and, similarly, a second entity could be termed a first entity, without changing the meaning of the description, so long as all occurrences of the "first entity" are renamed consistently and all occurrences of the second entity are renamed consistently. The first entity and the second entity are both entities, but they are not the same entity.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client and server systems, which typically inter-operate in a distributed client-server system and corresponding methods of organizing, storing information (e.g., entities) so as to enable the information to be efficiently retrieved in response to search queries and responding to data requests for a schemaless database in accordance with predefined criteria.

Figure 1:
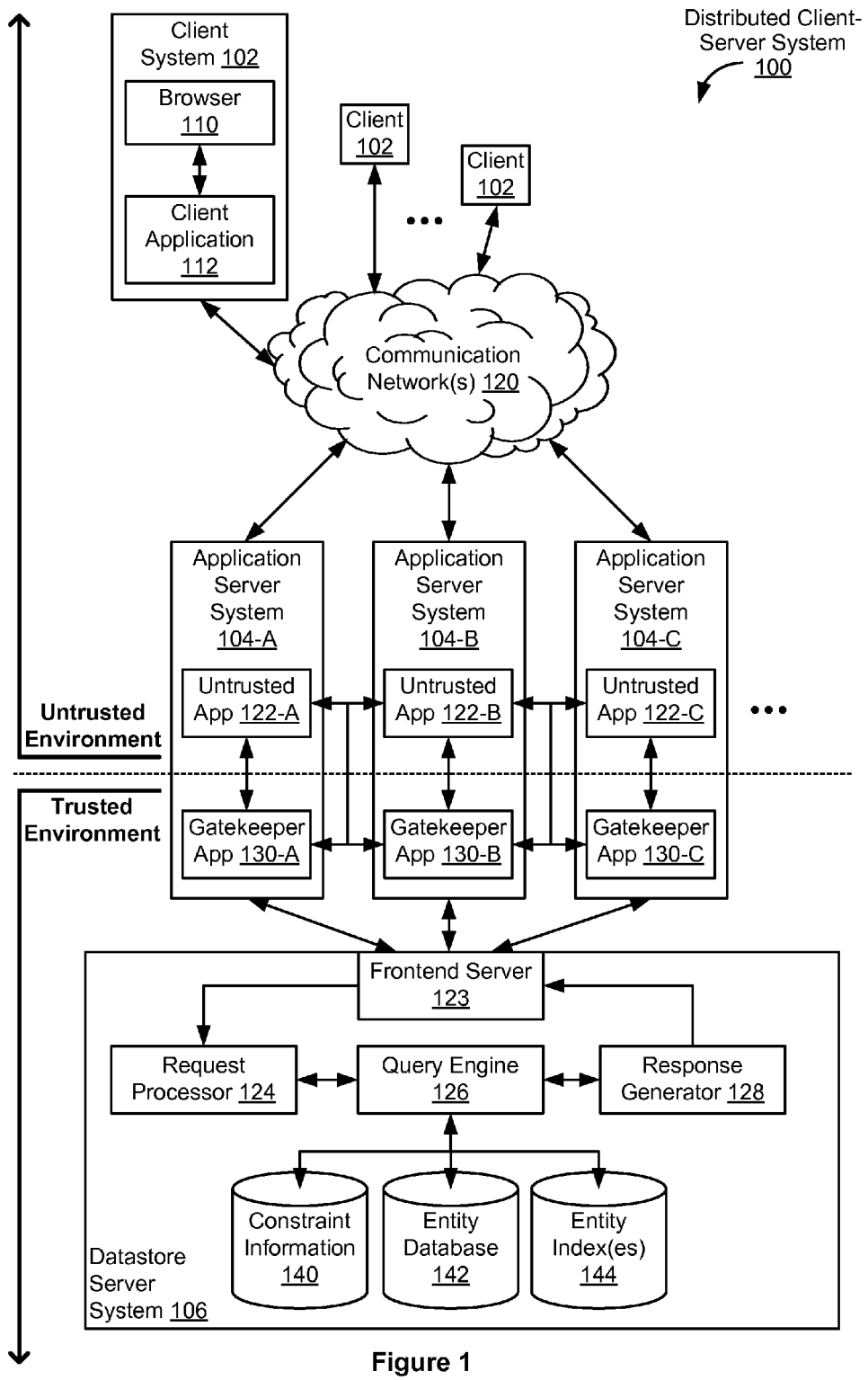
FIG. 1 is a block diagram illustrating a distributed client-server system, in accordance with some embodiments.

FIG. 1 includes a block diagram illustrating an exemplary distributed client-server system 100 for modifying data and processing data triggers based on the modified data. System 100 includes one or more Client System(s) 102 (a respective one of which is referred to herein as "Client 102"), one or more Application Server Systems 104 (a respective one of which is referred to herein as "App Server 104"), a Datastore Server System 106 (also referred to herein as "Datastore Server 106") and a Communication Network 120 for connecting Clients 102 to Application Server System 104. Communication Network 120 optionally includes the Internet, one or more local area networks (LANs), one or more wide area networks (WANs), other types networks, or a combination of such networks. Additionally, it should be understood that Datastore Server 106 and App Server 104 are also connected via a communication network such as the Internet, one or more local area networks (LANs), and/or one or more wide area networks (WANs). In some embodiments, the App Server 104 and the Datastore Server 106 are combined as part of a single server system and/or different functions of the two server systems are divided differently than shown in the exemplary configuration of FIG. 1. In particular, in some implementations, different App Servers (e.g., App Server 104-A and App Server 104-B) communicate with each other via one of the aforementioned communication networks.

Client 102 optionally includes Browser 110 and Client Application 112. Browser 110 can be a general purpose Internet browser (sometimes called a Web browser) having a browser window used for displaying a client application (e.g., an email application or a social networking application). A web application user interface associated with the client application is optionally implemented using hypertext markup language (HTML) or extensible markup language (XML) elements that are rendered by Browser 110. Alternatively, requests to interact with data items are, optionally, submitted via a stand-alone Client Application 112. After a user submits a request to interact with data items through Browser 110 or a stand-alone Client Application 112, Client 102 relays the request to App Server 104 via Communication Network 120. App Server 104 performs operations corresponding to the request and, optionally, sends a set of display information back to Client 102. Client Application 112 and/or Browser 110 uses the display information to render updated application information at Client 102.

Application Server System 104 includes Untrusted Application 122 that optionally includes a frontend module, data item interaction module, trigger executor and one or more marker handler(s), as discussed in more detail below. Untrusted Application 122 serves as a "back end" for the Client Application 112 at Client 102 and handles requests issued by Client Application 112. App Server 104 may host many different untrusted applications, each of which serves as a "back end" for a corresponding client application. Additionally one untrusted application may serve as a "back end" for multiple different client applications. App Server 104 also includes a Gatekeeper Application 130 that optionally includes a request processor and response processor in a trusted portion of App Server 104. Untrusted Application 122 applies constraints to data requests received from Client 102 and/or forwards data requests from Client 102 to another Untrusted Application 122 or to Gatekeeper Application 130, which applies constraints to the data requests before forwarding the data requests to Datastore Server 106. As used herein, constraints refer to limits data retrieval, storage and/or modification in a datastore. Specific examples of predefined constraints are described below in greater detail with reference to Table 1.

In some implementations, Untrusted Application 122 is a hosted application from a third-party (e.g., an entity that is not the user of Client 112 or the owner/operator of Datastore Server 106 and App Server 104) that is confined to an application sandbox. The application sandbox restricts communications between Untrusted Application 122 and Datastore Server 106 so as to limit the effect of intentional or unintentional pathological operations occurring within Untrusted Application 122 on App Server 104 and Datastore Server 106. The application sandbox also serves to provide a set of restrictions on the flow of information and requests between the untrusted environment of System 100 (e.g., Client 102 and Untrusted Application 122) and the trusted environment in System 100 (e.g., Datastore Server 106 and trusted processes in App Server 104 such as Gatekeeper Application 130). In the untrusted environment, users and application developers are allowed to perform operations without restrictions that would otherwise be necessary to protect the integrity of the trusted environment. A request processor of Gatekeeper Application 130 receives requests from Untrusted Application 122, optionally applies sandbox policies to ensure that the requests are safe and transmits corresponding requests to Datastore Server 106. A response processor of Gatekeeper Application 130 receives responses to the corresponding requests from Datastore Server 106, optionally translates the responses, and relays information corresponding to the responses to Untrusted Application 122. Various approaches to forwarding data requests and applying predefined constraints to data requests are described in greater detail below with reference to FIGS. 5A-5C.

Datastore Server System 106 includes Frontend Server 123, Request Processor 124, Query Engine 126, Response Generator 128, Constraint Information 140, Entity Database 142 and Entity Index(es) 144. In some implementations, Entity Database 142 is a schemaless database (e.g., data is stored in Entity Database 142 without reference to a predefined schema and thus Entity Database 142 does not require that all entities of a given kind have the same properties, as there is no predefined schema that specifies a predefined set of valid properties for respective kinds of entities). Frontend Server 123 communicates with Gatekeeper Application 130 at App Server 104 to receive data requests with constraint information and return processed results corresponding to received data requests. Request Processor 124 processes data requests from App Server 104 in accordance with the associated constraint information and generates queries to be processed by Query Engine 126. Query Engine 126 uses Entity Index(es) 144 to identify entities related to the data request (e.g., entities that are the subject of read and/or write operations due to the request), performs one or more operations (e.g., read and/or write operations), if necessary, in Entity Database 142 and provides information to Response Generator 128 corresponding to the information retrieved from Entity Index(es) 144, information retrieved from Entity Database 142 and/or information written to Entity Database 142. Response Generator 128 generates a response to the data request (e.g., a representation of information read from Entity Database 142 or Entity Index(es) 144 and/or a confirmation of information written to Entity Database 142 or Entity Index(es) 144) and transmits the response to Gatekeeper Application 130 via Frontend Server 123. Constraint Information 140, or a subset thereof, is optionally supplied to App Server 104 (e.g., Untrusted Application 122 and/or Gatekeeper Application 130) so as to enable App Server 104 to apply predefined constraints to data requests that are directed to Datastore Server 106 before the data requests are transmitted to Datastore Server 106.

In some implementations, Entity Index(es) 144 are generated by an index generator at Datastore Server 106. In some embodiments Indexes 144 are generated prior to receiving requests from Untrusted Application 122 and an index generator of Datastore Server 106 continues to update Indexes 144 in between requests from Untrusted Application 122. Generating Entity Index(es) 144 prior to receiving the requests for access to entities increases the speed with which entities can be retrieved, thereby reducing latency of responding to data requests. Once entities have been retrieved by Datastore Server 106 and passed to Gatekeeper Application 130, which transmits the entities to Untrusted Application 122, Untrusted Application 122 can generate an updated application state (e.g., display information) to deliver to Client 102, via Communication Network 120, for display at Client 102 (e.g., via Browser 110 or Client Application 112).

Figure 2:
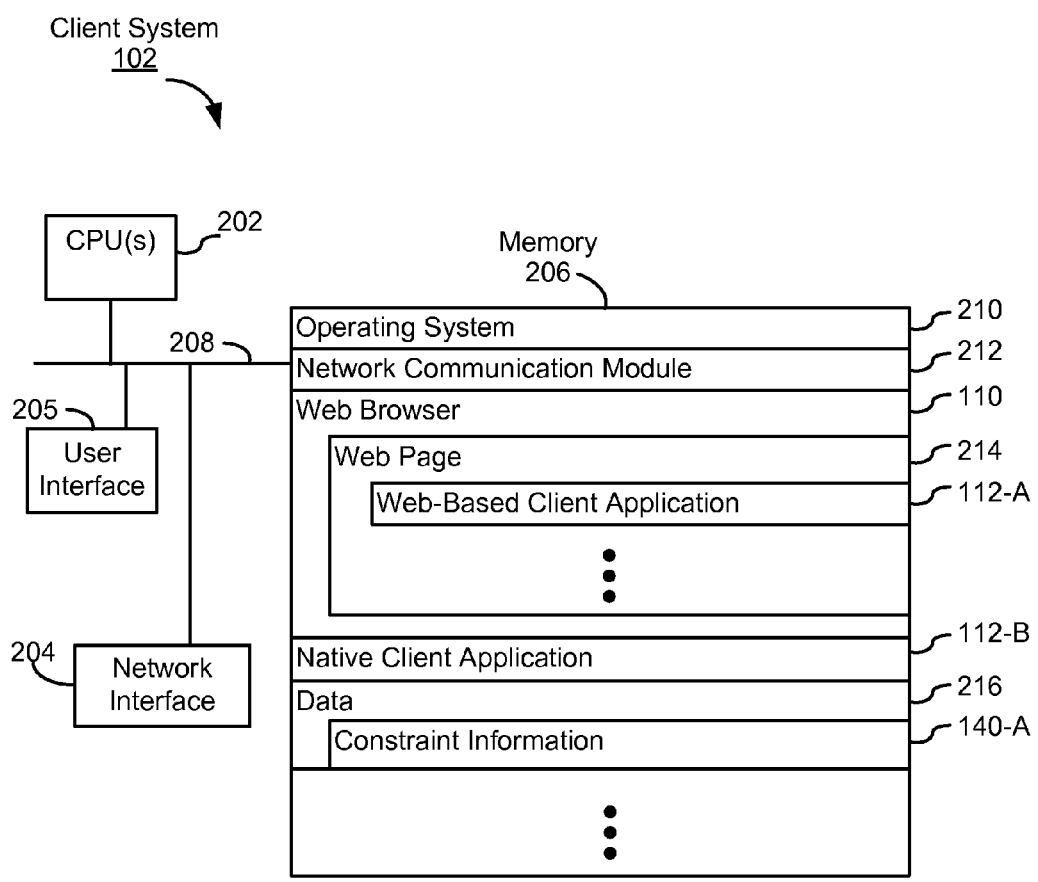
FIG. 2 is a block diagram illustrating a client system, in accordance with some embodiments.

FIG. 2 is a block diagram illustrating Client System 102 in accordance with some embodiments. Client 102 typically includes one or more processing units 202 (labeled CPU(s) in FIG. 2, and sometimes called processors or microprocessors), one or more communication interfaces such as Network Interface 204, Memory 206, a User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

Operating System 210 that includes procedures for handling various basic system services and for performing hardware dependent tasks;

Network Communication Module (or instructions) 212 that is used for connecting Client 102 to other computers (e.g., App Server 104 and Datastore Server 106) via one or more Network Interfaces 204 (wired or wireless) and one or more Communication Networks 120 (FIG. 1), such as the Internet, other wide area networks, local area networks, metropolitan area networks, and so on;

Web Browser 110 for loading web pages, such as a Web Page 214 including a web application, which optionally includes code for executing a Web-Based Client Application 112-A as an embedded application in Web Page 214, where Web-Based Client Application 112-A displays application interface information received from App Server 104;

Client Application 112-B (e.g., a stand-alone email client) for sending requests to App Server 104 and displaying data received from App Server 104 (e.g., from Untrusted Application 122 in FIG. 1); and optionally, Data 216 such as cached application data (e.g., recently accessed search results, recently viewed data items, etc.) and/or Constraint Information 140-A corresponding to constraints to be imposed on data requests that are to be processed by Datastore Server 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 optionally stores additional modules and data structures not described above.

Figure 3:
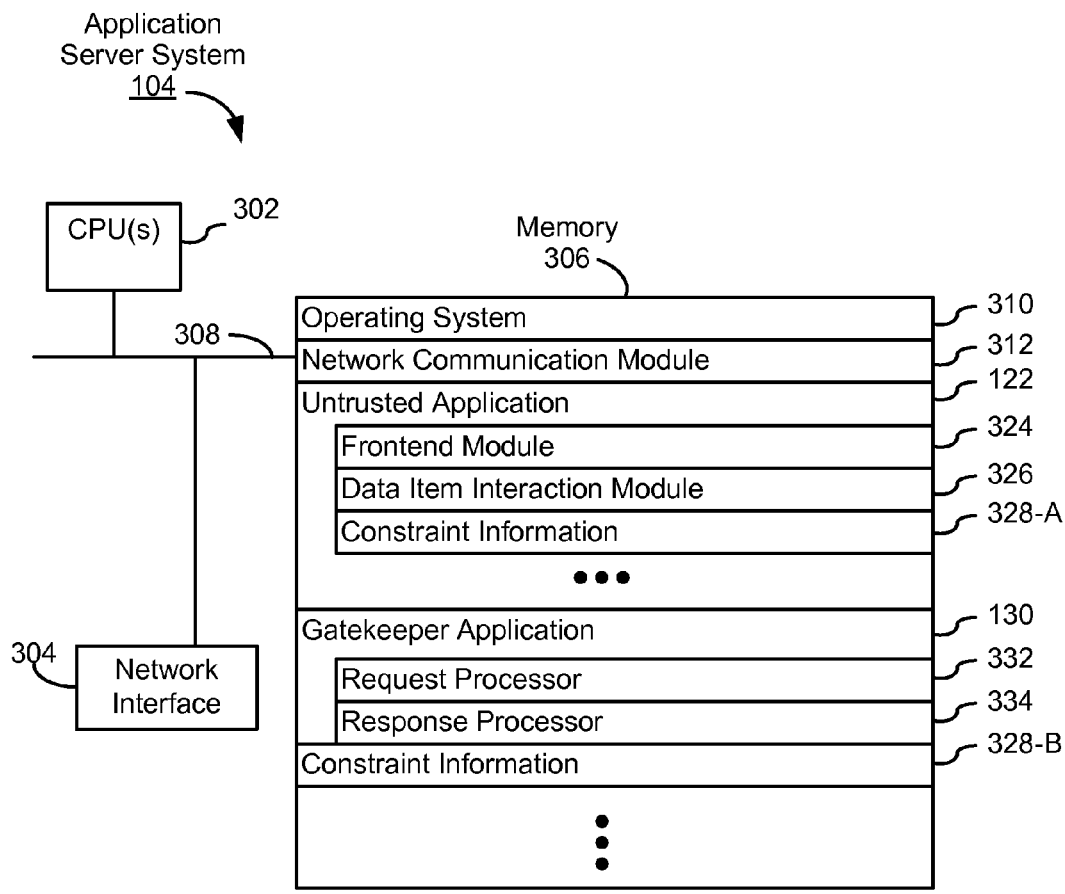
FIG. 3 is a block diagram illustrating an application server system, in accordance with some embodiments.

FIG. 3 is a block diagram illustrating Application Server System 104 (e.g., "App Server 104") in accordance with some embodiments. App Server 104 typically includes one or more processing units 302 (labeled CPU(s) in FIG. 3, and sometimes called processors or microprocessors), one or more communication interfaces such as Network Interface 308, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

Operating System 310 that includes procedures for handling various basic system services and for performing hardware dependent tasks;

Network Communication Module (or instructions) 312 that is used for connecting App Server 104 to other computers (e.g., Client 102 or Datastore Server 106) via one or more Network Interfaces 304 (wired or wireless) and one or more Communication Networks 102 (FIG. 1), such as the Internet, other wide area networks, local area networks, metropolitan area networks, and so on;

Untrusted Application 122 for communicating with Client Application 112 (FIG. 2), where Untrusted Application 122 has limited permissions to perform operations within a trusted environment and includes one or more of:

Frontend Module 324 for coordinating communication between Untrusted Application 122 and Client Applications with which App Server 104 communicates;

Data Item Interaction Module 326 for generating requests to retrieve and/or modify data items stored at Datastore Server 106 and generating application information to be transmitted to Client 102, where the application information specifies information to display at Client 102; and Constraint Information 328-A corresponding to constraints to be imposed on data requests that are to be processed by Datastore Server 106;

Gatekeeper Application 130 for mediating communication between Untrusted Application 122 and Datastore Server 106 and, optionally, mediating communication between Untrusted Application 122 and other applications including other gatekeeper applications and/or untrusted applications at other application servers, Gatekeeper Application 130 optionally includes one or more of:

Request Processor 332 for processing requests from Untrusted Application 122, transmitting requests to Datastore Server 106 and, optionally, applying sandbox policies to ensure that the requests are safe to transmit to Datastore Server 106; and Response Processor 334 for processing responses from Datastore Server 106 to requests from Untrusted Application 122, transmitting responses to Untrusted Application 122 and, optionally, translating the responses to a format suitable for delivery of the responses to Untrusted Application 122; and Constraint Information 328-B corresponding to constraints to be imposed on data requests that are to be processed by Datastore Server 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows an "Application Server System" 104, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement an Application Server System 104 and how features are allocated among them will vary from one implementation to another, and optionally depends in part on the amount of data traffic that the system must handle during peak usage periods as well as during average usage periods.

Figure 4:
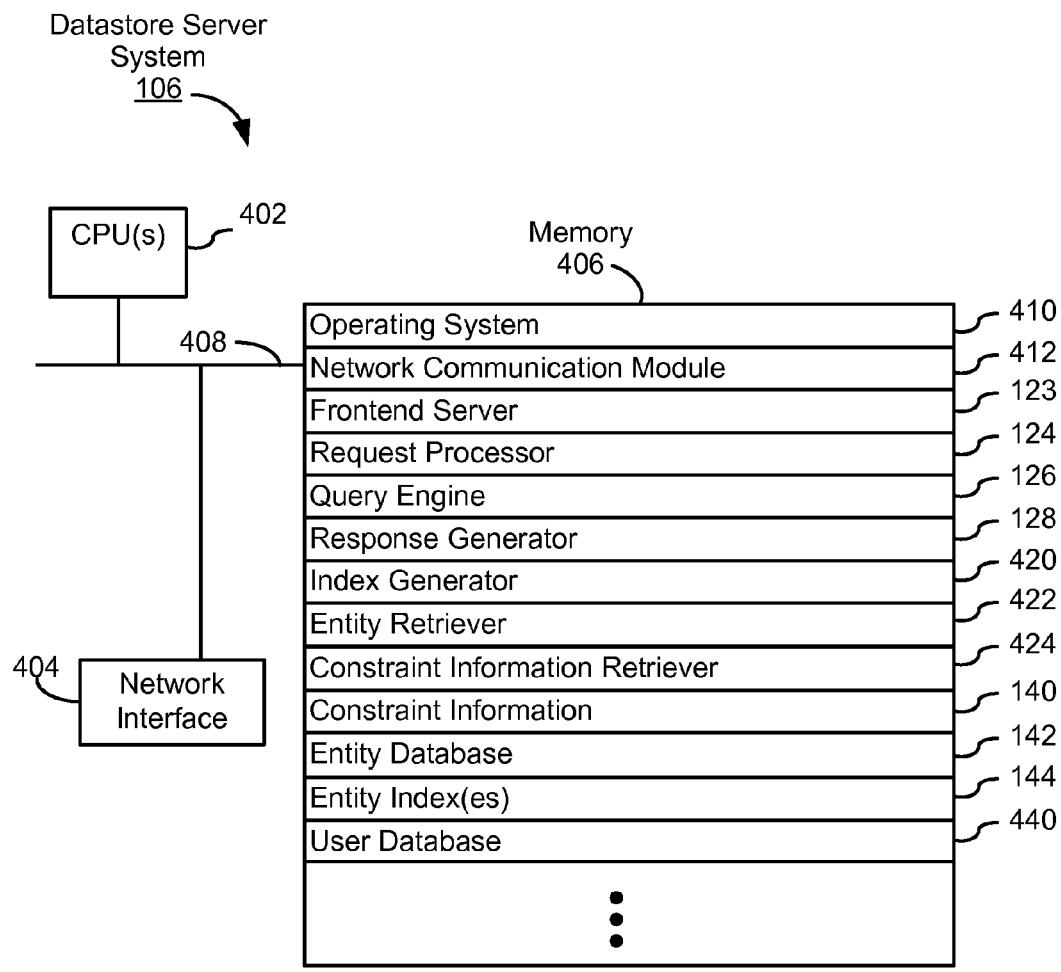
FIG. 4 is a block diagram illustrating a datastore server system, in accordance with some embodiments.

FIG. 4 is a block diagram illustrating a Datastore Server System 106 (e.g., "Datastore Server 106") in accordance with some embodiments. Datastore Server 106 typically includes one or more processing units 402 (labeled CPU(s) in FIG. 4, and sometimes called processors or microprocessors), one or more communication interfaces such as Network Interface 404, Memory 406, and one or more Communication Buses 408 for interconnecting these components. Communication Buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

Operating System 410 that includes procedures for handling various basic system services and for performing hardware dependent tasks;

Network Communication Module (or instructions) 412 that is used for connecting Datastore Server 106 to other computers (e.g., Client 102 or App Server 104) via one or more Network Interfaces 404 (wired or wireless) and one or more Communication Networks 102 (FIG. 1), such as the Internet, other wide area networks, local area networks, metropolitan area networks, and so on;

Frontend Server 132 for mediating communication between Datastore Server 106 and App Server 104;

Request Processor 124 for processing data requests from Gatekeeper Applications 130 and generating queries for execution at Datastore Server 106 based on the received data requests and, optionally, constraint information included with the data requests;

Query Engine 126 for processing requests generated by Request Generator 124 by searching one or more Entity Index(es) 144 and performing read/write operations on entities in Entity Database 142 based on information acquired by searching Entity Index(es) 144;

Response Generator 128 for generating responses to data requests from Gatekeeper Application 130 based on read/write operations performed on entities in Entity Database 142 and index entries in Entity Index(es) 144 by Query Engine 126;

Index Generator 420 for generating indexes (e.g., Entity Indexes 144) for use in retrieving entities from Entity Database 142, in some implementations Index Generator 420 generates a large number of indexes (e.g., at least one index for each property that can be used to sort and/or filter search results) so that for each possible combination of filters and sort orders in a search query, there exists an index including an index portion where the index entries matching the combination of filters are arranged in a contiguous block of index entries sorted in the sort order;

Entity Retriever 422 for retrieving entities from Entity Database 142 (e.g., in response to requests for the entities from Untrusted Application 122 in FIG. 3);

Constraint Information Retriever 424 for retrieving data request processing constraints from Constrain Information 140 (e.g., in response to requests for the constraint information associated with Untrusted Application 122 in FIG. 3);

Constraint Information 140, which is information indicative of data request processing constraints corresponding to constraints to be imposed on data requests that are to be processed by Datastore Server 106 (e.g., Datastore Server 106 stores constraint information for retrieval and use by Untrusted Application 122 and/or Gatekeeper Application 130, a subset of which is selected by Untrusted Application 122 and/or Gatekeeper Application 130 and sent back to Datastore Server 106 along with a corresponding data request);

Entity Database 142 for storing entities for use in generating responses to data requests; in some implementations, Entity Database 142 is a schemaless database (e.g., data is stored in Entity Database 142 without reference to a predefined schema and thus Entity Database 142 does not require that all entities of a given kind have the same properties, as there is no predefined schema that specifies a predefined set of valid properties for respective kinds of entities);

Entity Index(es) 144 for storing information about entities and properties of the entities, in some embodiments Entity Index(es) 144 are sorted in accordance with values of the properties for the entities; and User Database 440 for storing information about users and user search preferences; in some embodiments in which entities are user specific (e.g., a collection of a user's photos, emails or other documents), and User Database 440 stores information identifying which entities and indexes a particular user has authority to access, User Database 440, optionally, stores other user account information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Datastore Server System" 106, FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a Datastore Server System 106 and how features are allocated among them will vary from one implementation to another, and optionally depends in part on the amount of data traffic that the system must handle during peak usage periods as well as during average usage periods.

Constraint Enforcement Options

Figure 5A:
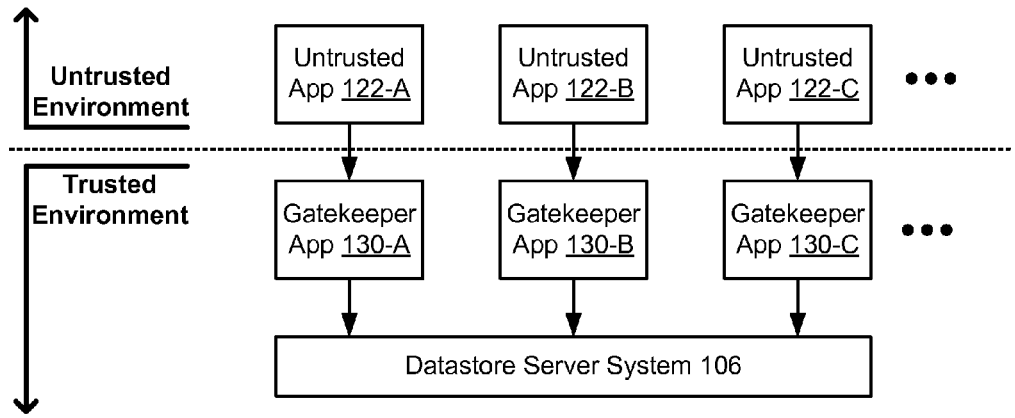
FIGS. 5A-5C include block diagrams illustrating different data request processing approaches for processing a data request associated with a constraint-restricted portion of a schemaless database, in accordance with some embodiments.
Figure 5B:
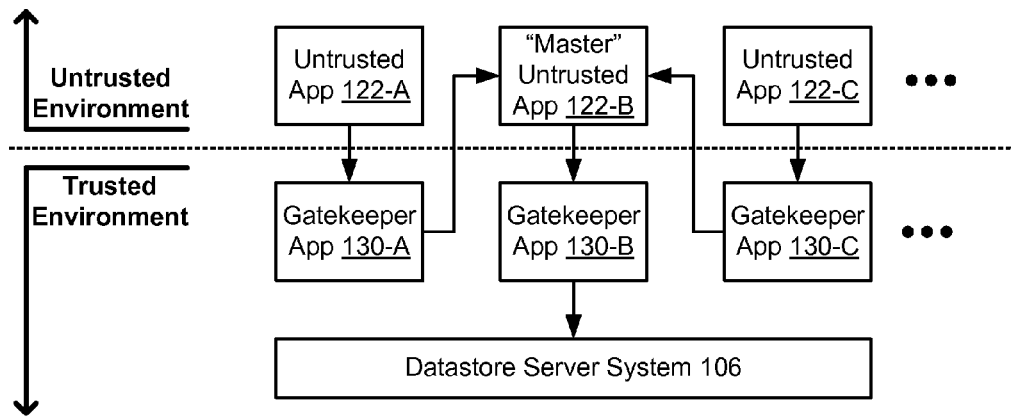
Figure 5C:
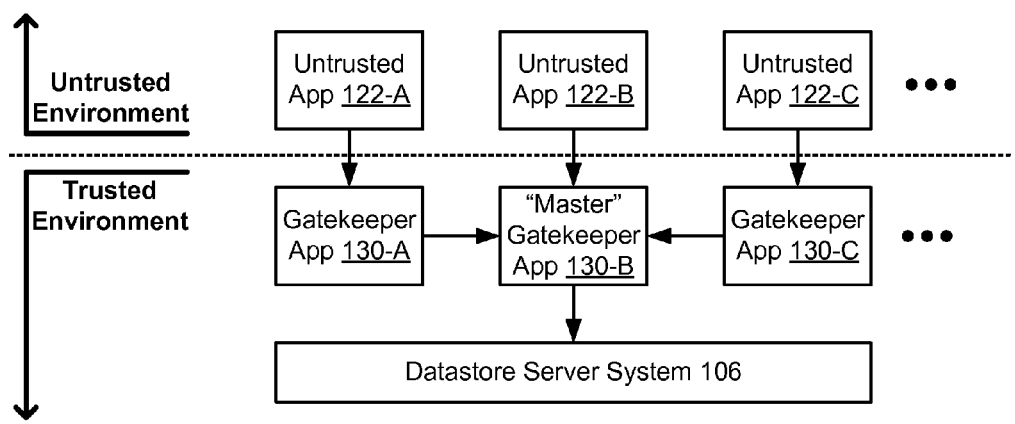

Attention is now directed to FIGS. 5A-5C, which illustrate different data request processing approaches for processing a data request associated with a constraint-restricted portion of a schemaless database. In particular, FIG. 5A illustrates an embodiment where a plurality of different Untrusted Applications 122 each have a corresponding Gatekeeper Application 130 that routes data requests to Datastore Server 106 without a corresponding "Master" application. In contrast, the embodiment shown in Figure B uses a "Master" Untrusted Application through with data requests for Datastore Server 106 are routed, while the embodiment shown in FIG. 5C uses a "Master" Gatekeeper Application through with data requests for Datastore Server 106 are routed.

In FIG. 5A illustrates an embodiment where a plurality of different Untrusted Applications 122 have different corresponding Gatekeeper Applications 130. In some embodiments, predefined constraints are provided to individual Untrusted Applications 122 and/or corresponding Gatekeeper Applications 130. An advantage of this arrangement is that different Untrusted Applications 122 can be subject to different predefined constraints. However, in situations where multiple instances of a single application or multiple different applications that are associated with a same domain are subject to the same predefined constraints, it can be difficult to maintain the same set of predefined constraints at the different untrusted applications and/or gatekeeper applications. Thus, in some circumstances, it is advantageous to select a particular Untrusted Application 122 or a particular Gatekeeper Application 130 to serve as a "Master" application, through which data requests for Datastore Server 106 are routed, so that predefined constraints that are maintained at the "Master" application can be applied to data requests from a plurality of different applications (e.g., multiple instances of a same application or instances of multiple different applications that are subject to common control such as being applications within a single administrative domain).

FIG. 5B illustrates an embodiment where a plurality of different Untrusted Applications 122 are associated with a "Master" Untrusted Application 122-B in FIG. 5B and Gatekeeper Applications 130 for Untrusted Applications other than "Master" Untrusted Application 122-B route data requests through "Master" Untrusted Application 122-B and a corresponding Gatekeeper Application 130-B that routes data requests to Datastore Server 106. In some embodiments, either one of the other Untrusted Applications or one of the other Gatekeeper Applications determines that a data request generated by one of the other Untrusted Applications (e.g., Untrusted Application 122-A or Untrusted Application 122-C) is associated with a constraint-restricted portion of a schemaless database (e.g., a database stored at Datastore Server 106) and routes the data request to "Master" Untrusted Application 122-B so that "Master" Untrusted Application 122-B can apply the predefined constraints to the data request or append the predefined constraints to the data request prior to transmitting the data request to Gatekeeper 130-B for transmission to Datastore Server System 106. One advantage of using a "Master" Untrusted Application 122-B that is in the untrusted environment is that an application in the untrusted environment is generally permitted to execute programmatic constraints that have not been verified as being "safe." In other words, "Master" Untrusted Application 122-B can execute programmatic constraints that might crash "Master" Untrusted Application 122-B or take up an undefined quantity of processing resources, because the sandbox in which "Master" Untrusted Application 122-B operates insulates other portions of the distributed server system (e.g., including multiple App Servers 104 and one or more Datastore Servers 106) from damage that could be caused by executing the programmatic constraints.

In some embodiments, a response from Datastore Server 106 to the data request is routed back through "Master" Untrusted Application 122-B (e.g., a data request from Untrusted Application 122-A is routed to Datastore Server 106 through "Master" Untrusted Application 122-B and Gatekeeper App 130-B and the response to the data request is routed back to Untrusted Application 122-A through Gatekeeper Application 130-B and "Master" Untrusted Application 122-B). In some embodiments, a response from Datastore Server 106 to the data request is routed directly back to a gatekeeper application corresponding to an untrusted application from which the data request was received (e.g., a data request from Untrusted Application 122-A is routed to Datastore Server 106 through "Master" Untrusted Application 122-B and Gatekeeper Application 130-B but the response to the data request is routed back to Untrusted Application 122-A through Gatekeeper Application 130-A without passing through "Master" Untrusted Application 122-B and Gatekeeper Application 130-B).

FIG. 5C illustrates an embodiment where a plurality of different Untrusted Applications 122 are associated with a "Master" Gatekeeper Application 130-B in FIG. 5C and Gatekeeper Applications 130 for each of the plurality of Untrusted Applications other than "Master" Untrusted Application 122-B route data requests through "Master" Gatekeeper Application 122-B that subsequently routes data requests to Datastore Server 106. In some embodiments, either one of the Untrusted Applications or one of the other Gatekeeper Applications determines that a data request generated by one of the Untrusted Applications is associated with a constraint-restricted portion of a schemaless database (e.g., a database stored at Datastore Server 106) and routes the data request to "Master" Gatekeeper Application 130-B so that "Master" Gatekeeper Application 130-B can apply the predefined constraints to the data request or append the predefined constraints to the data request prior to transmitting the data request to Datastore Server 106.

In some embodiments, responses from Datastore Server 106 to the data request is routed back through "Master" Gatekeeper Application 130-B (e.g., a data request from Untrusted Application 122-A is routed to Datastore Server 106 through "Master" Gatekeeper App 130-B and the response to the data request is routed back to Untrusted Application 122-A through "Master" Gatekeeper Application 130-B). In some embodiments, a response from Datastore Server 106 to the data request is routed directly back to a gatekeeper application corresponding to an untrusted application from which the data request was received (e.g., a data request from Untrusted Application 122-A is routed to Datastore Server 106 through "Master" Gatekeeper Application 130-B but the response to the data request is routed back to Untrusted Application 122-A through Gatekeeper Application 130-A without passing through "Master" Gatekeeper Application 130-B).

As used herein, constraints refer to limits on data retrieval, storage and/or modification in a datastore. In particular, in some situations data corresponding to an application or a set of applications is constrained to a predefined data model where data items (e.g., entities) include certain predefined fields and allowable values for the fields are specified by the data model. Predefined constraints include constraints on the allowable keys (e.g., unique identifiers), fields, and/or field values for data items/entities. Applying a predefined constraint to a data request includes forgoing performance of at least a portion of a data request that includes a request that violates one or more of the predefined constraints (e.g., if a value of a date field is constrained to include dates after the current date, a data request to write a date to the date field that is before the current date will be rejected and will not be performed). In some embodiments, a data request that violates one of the predefined constraints is terminated. In some embodiments, portions of a data request that do not violate predefined constraints are processed while the portion of the data request that violates the predefined constraints is terminated. A non-exhaustive list of possible predefined constraints is provided in Table 1, below.

TABLE 1

| | |
|---|---|
| Key Constraints | Entities of kind X must have a Key with a numeric identifier |
| | Entities of kind X must have a Key with a string identifier |
| | Entities of kind X must have a Key whose path has a depth $\{>, >=, ==, <=, <, !=\}$ Y |
| | Entities of kind X must have a Key whose parent at depth Y is of Kind Z |
| | Entities of kind X must have a Key whose parent at depth Y exists in the datastore |
| | Entities of kind X must have a Key whose parents at all depths exist in the datastore |
| Property Constraints | Entities of kind X must have a property named Y |
| | Entities of kind X must have a not-null property named Y |
| | Entities of kind X must have a property named Y with a value of type Z |
| | Entities of kind X must have a property named Y with a value of type Z belonging to a set of pre-defined values |
| | Entities of kind X must have property names that conform to a predefined regular expression Y (can be used to enforce an exact set of properties for a kind and also to enforce naming conventions) |
| | Values for property Y belonging to kind X must be unique |
| List Property Constraints | Entities of kind X must have a list property named Y with a size $\{>, >=, ==, <=, <, !=\}$ Z |
| | Entities of kind X must have a list property named Y with a size $\{>, >=, ==, <=, <, !=\}$ Z |
| | Entities of kind X with a list property named Y cannot contain NULL values |
| Constraints Associated with Properties of Specific Types | Integers - value must be $\{>, >=, ==, <=, <, !=\}$ value Z |
| | Floats - value must be $\{>, >=, ==, <=, <, !=\}$ value Z; have min precision; and/or have max precision |
| | String - value must have min length; max length; and/or conform to a predefined regular expression |
| | Date - value must have min; max; and/or precision (must fall on the boundary of a second/ minute/ hour/ day/ |

TABLE 1-continued

| | |
|---|---|
| | week/ month/ year)<br>Text - value must have min length; and/or max length<br>Link - value must conform to a predefined regular expression<br>Blob - value must have min size; and/or max size<br>Geographic point - must have location conforming to x min; x max; y min; y max; and/or be located inside a predefined geographical region<br>User - must be associated with an authorized domain<br>Reference Properties (Keys) - must belong to the same entity group as the Key of the entity being saved; and/or must reference an existing Entity (implies the previous constraint) |
| Cross-Property Constraints | For any Entity of Kind X, property Y and property Z must<br>be the same type<br>For any Entity of Kind X, property Y and property Z must<br>be multi-value properties with the same number of elements<br>For any Entity of Kind X, property Y {>, >=, ==, <=, <, !=}<br>property Z |
| Programmatic Constraints | A code or script defined by an application developer to enforce data constraints (e.g., for a hotel reservation schema a programmatic constraint could enforce a requirement that reservations include "three night minimum stay for stays that occur during labor day weekend") |

Constraint Enforcement Overview

Figure 6A:
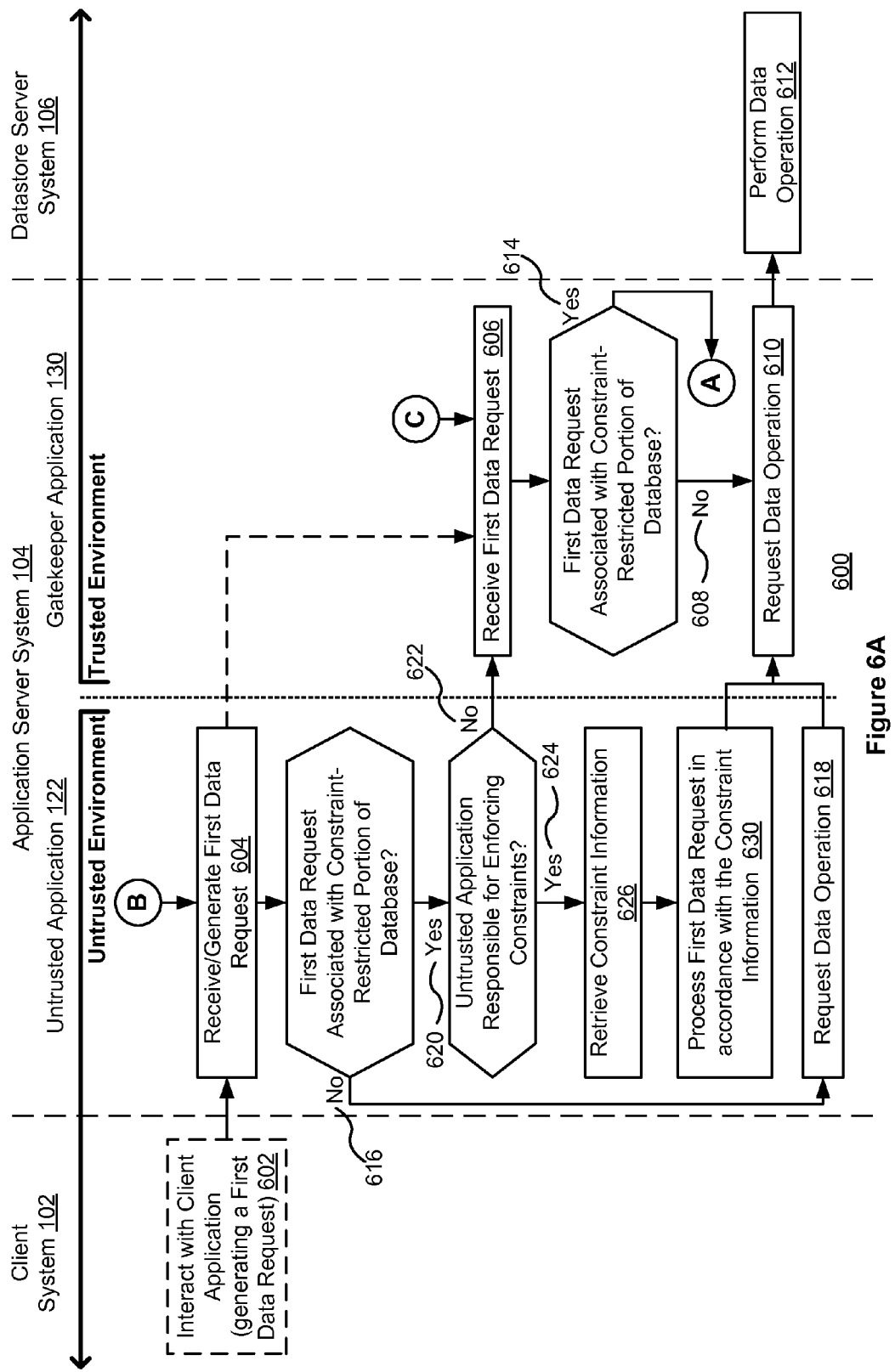
FIGS. 6A-6B include a flow chart illustrating a method for requesting processing of, and processing, a data request associated with a constraint-restricted portion of a schemaless database, in accordance with some embodiments.
Figure 6B:
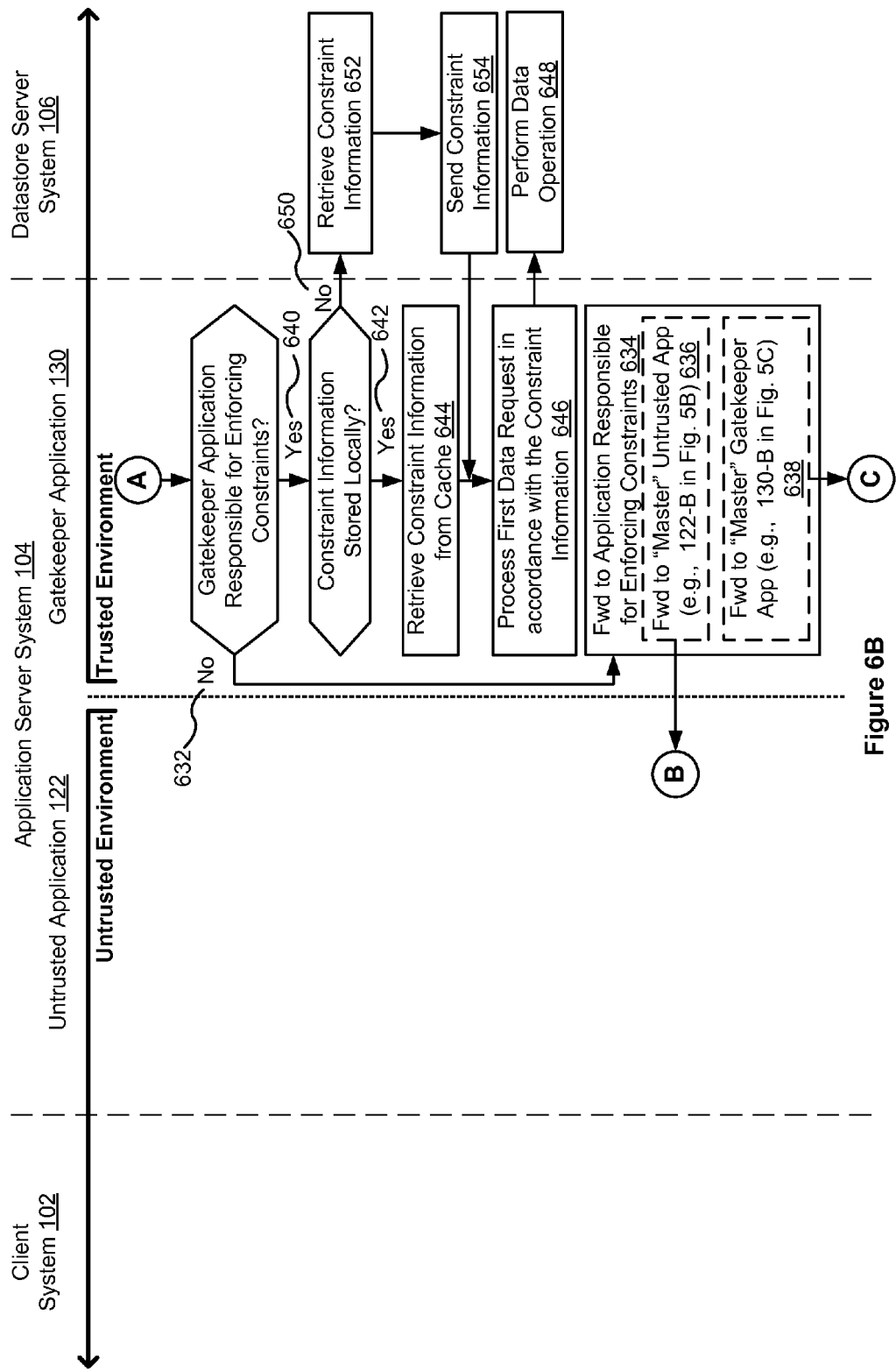
Figure 7A:
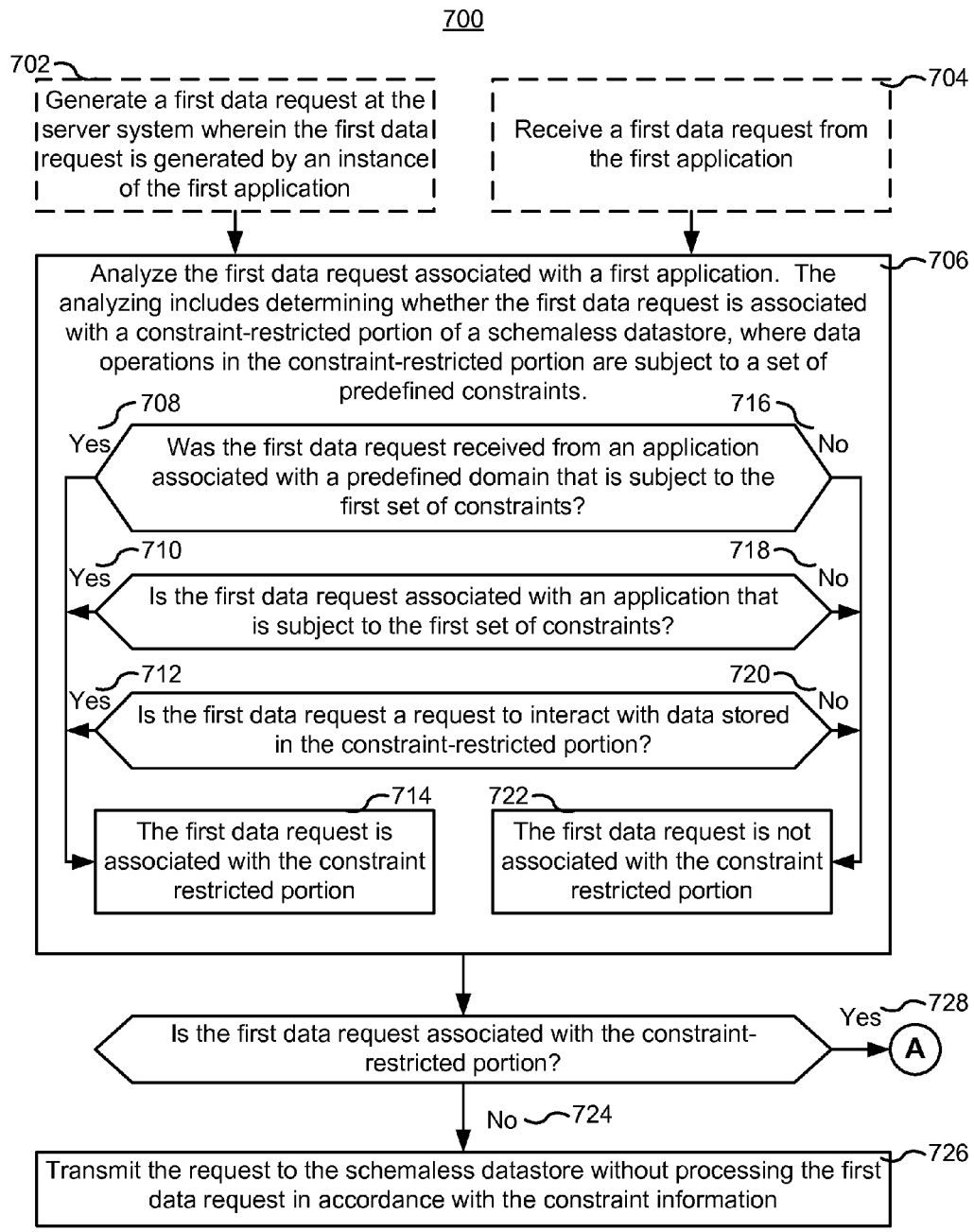
FIGS. 7A-7D include a flow chart illustrating a method for processing a data request associated with a constraint-restricted portion of a schemaless database, in accordance with some embodiments.
Figure 7B:
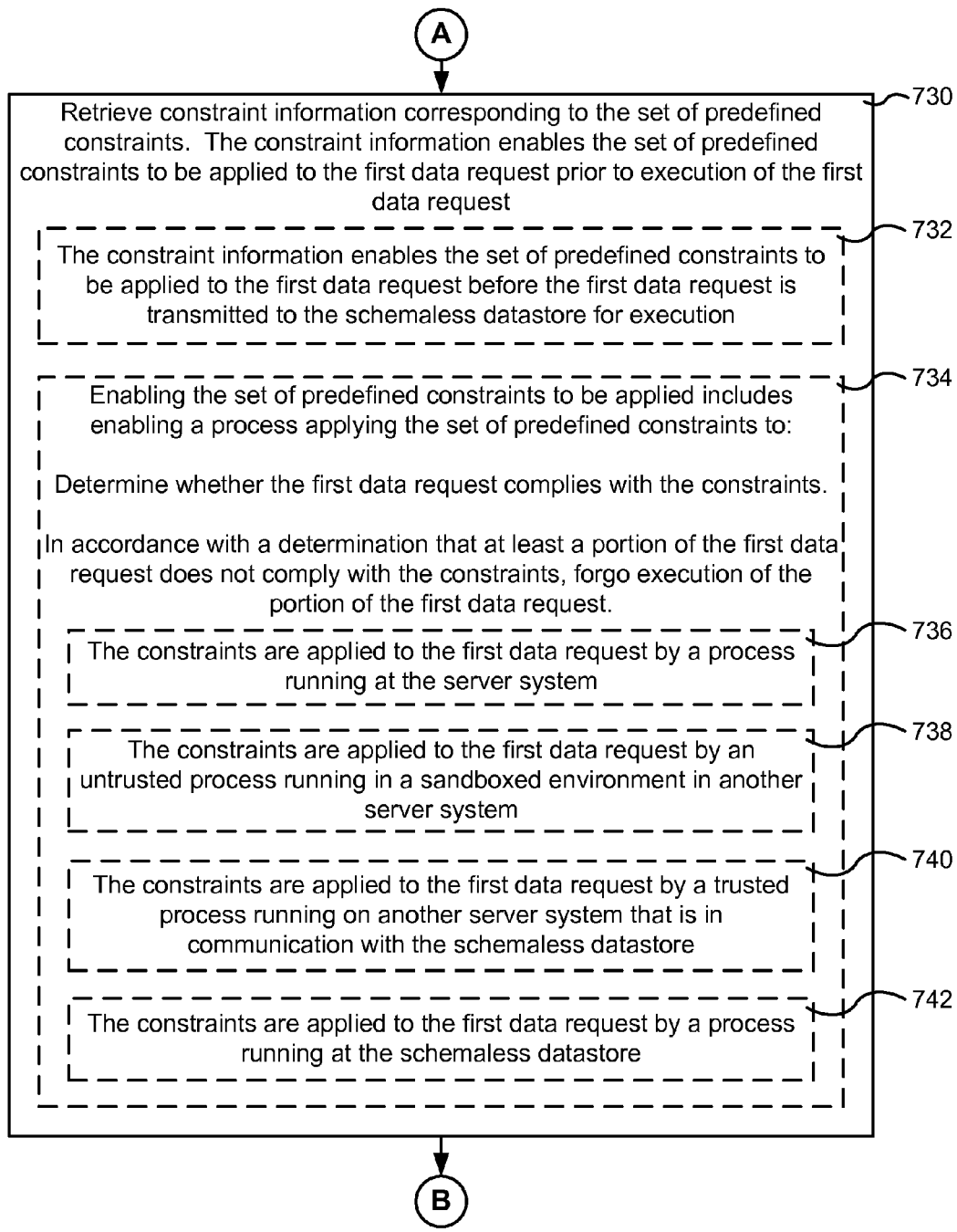
Figure 7C:
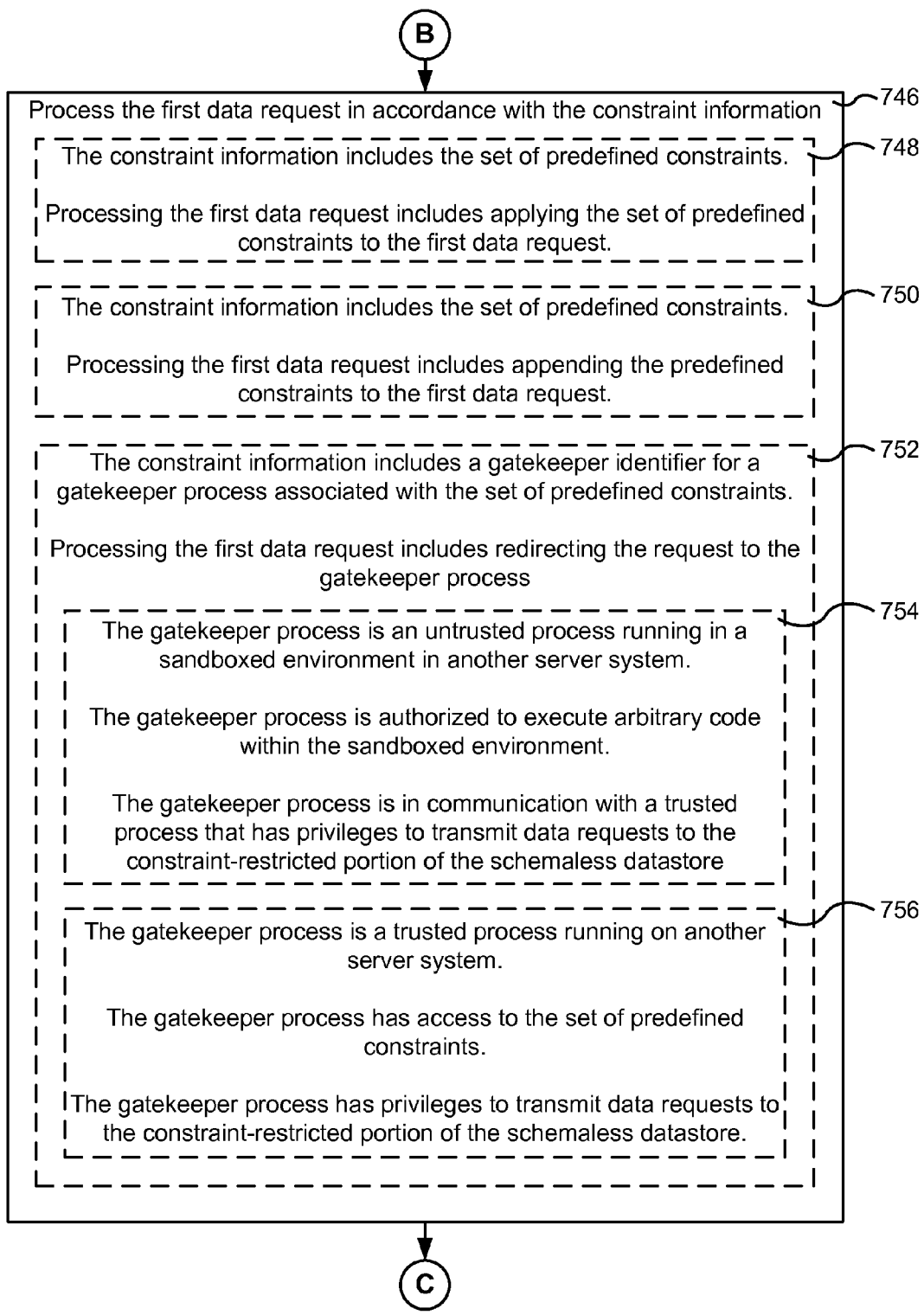
Figure 7D:
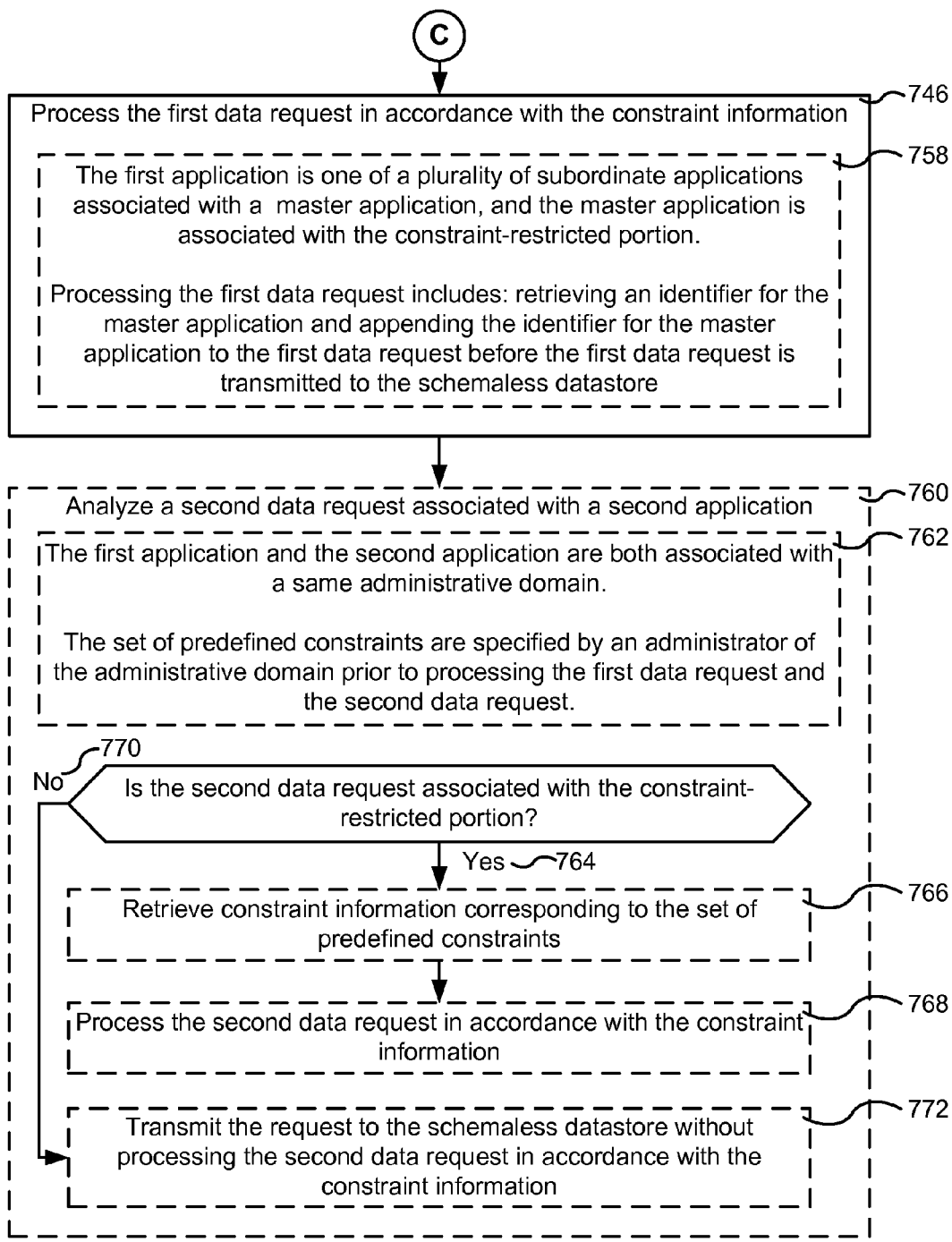

FIGS. 6A-6B include a flowchart representing a method 600 for requesting processing of, and processing, a data request associated with a constraint-restricted portion of a schemaless database, according to certain embodiments. Method 600 is, optionally, governed by instructions that are stored in a non-transitory computer readable storage medium and that are executed by one or more processors of one or more servers (e.g., Client 102, App Server 104 and/or Datastore Server 106 as shown in FIGS. 1-4). Each of the operations shown in FIG. 6 typically corresponds to instructions stored in a computer memory or non-transitory computer readable storage medium (e.g., memory 206 of Client 102, memory 306 of App Server 104 and/or memory 406 of Datastore Server 106 in FIGS. 2-4). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted or executed by one or more processors. In various embodiments, some operations in method 600 may be combined and/or the order of some operations may be changed from the order shown in FIGS. 6A-6B.

In some embodiments, Client System 102 interacts (602) with Client Application (e.g., Client Application 112 in FIG. 1) to generate a first data request, which is transmitted to Untrusted Application 122 at App Server 104. In some embodiments, Untrusted Application 122 receives (604) the first data request from Client 102. Alternatively, in some embodiments, Untrusted Application 122 generates the first data request. In some embodiments, the first data request is generated based on a communication from Client 102. In some embodiments, the first data request is generated by Untrusted Application 122 but is not based directly on an operation performed at Client System 102 (e.g., the first data request is based on a periodic event that occurs at Untrusted Application 122 such as a backup operation or based on input from another source such as Datastore 106).

In some implementations, the first data request is transmitted directly from Untrusted Application 122 to Gatekeeper Application 130 in the trusted environment, while in other implementations, the first data request is evaluated for various characteristics, prior to being transmitted to Gatekeeper Application 130. In some embodiments, Gatekeeper Application 130 receives (606) the first data request and determines whether or not the first data request is associated with the constraint-Restricted Portion of Database. In accordance with a determination that the first data request is not (608) associated with the constraint-restricted portion of the database, Gatekeeper Application 130 requests (610) performance of a data operation (e.g., a read or write operation) corresponding to the first data request at Datastore Server 106. In response to receiving the request to perform the data operation, Datastore Server 106 performs (612) the data operation. In contrast, in accordance with a determination that the first data request is (614) associated with the constraint-restricted portion of the database, Gatekeeper Application 130 performs additional operations to enforce the predefined constraints associated with the constraint-restricted portion of the database (e.g., one or more of operations 632-654, described in greater detail below).

In some embodiments, after receiving/generating the first data request, Untrusted Application 122 determines whether the first data request is associated with a constraint-restricted portion of the database. In accordance with a determination that the first data request is not (616) associated with the constraint-restricted portion of the database, Untrusted Application 122 sends a request to Gatekeeper Application 130 requesting (618) performance of the data operation, the request from Untrusted Application 122 is forwarded or used to generate a corresponding request (610) for performance of a data operation (e.g., a read or write operation) corresponding to the first data request at Datastore Server 106. In response to receiving the request to perform the data operation, Datastore Server 106 performs (612) the data operation.

In contrast, in some embodiments, in accordance with a determination that the first data request is (620) associated with a constraint-restricted portion of the database, Untrusted Application 122 determines whether Untrusted Application 122 is responsible for enforcing the constraints. In accordance with a determination that Untrusted Application 122 is not (622) responsible for enforcing the constraints, Untrusted Application 122 forwards the first data request to Gatekeeper Application 130, which processes the first data request as described in greater detail above. However, in accordance with a determination that Untrusted Application 122 is (624) responsible for enforcing the constraints (e.g., Untrusted Application 122 in FIG. 6A is "Master" Untrusted Application 122-B in FIG. 5B), Untrusted Application 122 retrieves (626) constraint information (e.g., from local storage, from a cache stored by Gatekeeper Application 130 or from Datastore Server 106) and processes (630) the first data request in accordance with the constraint information. In some embodiments processing the first data request in accordance with the constraint information includes sending a request to perform a data operation corresponding to the first data operation and the constraint information to Gatekeeper Application, which, in turn, generates a corresponding request (610) for performance of a data operation (e.g., a read or write operation) corresponding to the first data request at Datastore Server 106. In response to receiving the request to perform the data operation, Datastore Server 106 performs (612) the data operation (e.g., performs an operation corresponding to the first data request in accordance with the constraints specified by Untrusted Application 122).

In some embodiments, in circumstances where the first data request is associated with a constraint-restricted portion of the database, Gatekeeper Application 130 determines whether Gatekeeper Application 130 is responsible for enforcing the constraints corresponding to the constraint-restricted portion of the database. In accordance with a determination that Gatekeeper Application 130 is not (632) responsible for enforcing the constraints corresponding to the constraint-restricted portion of the database, Gatekeeper Application 130 forwards (634) the first data request to an application that is responsible for enforcing the constraints. In some embodiments, the application that is responsible for enforcing the constraints is a "Master" untrusted application and Gatekeeper Application 130 forwards (636) the first data request to the "Master" untrusted application (e.g., "Master" Untrusted Application 122-B in FIG. 5B). In some embodiments, the application that is responsible for enforcing the constraints is a "Master" gatekeeper application and Gatekeeper Application 130 forwards (638) the first data request to the "Master" gatekeeper application (e.g., "Master" Gatekeeper Application 130-B in FIG. 5C).

In contrast, in some embodiments, in accordance with a determination that Gatekeeper Application 130 is (640) responsible for enforcing the constraints corresponding to the constraint-restricted portion of the database (e.g., Gatekeeper Application 130 in FIG. 6B is the "Master" Gatekeeper Application 130-B in FIG. 5C), Gatekeeper Application 130 proceeds to obtain the constraint information and process the first data request in accordance with the constraint information. In some embodiments the constraint information is stored locally and in some embodiments the constraint information is stored remotely and is retrieved by Gatekeeper Application 130. When the constraint information is (642) stored locally, Gatekeeper Application 130 retrieves (644) the constraint information from a local cache and processes (646) the first data request in accordance with the constraint information to generate a data operation. After retrieving the constraint information and generating the data operation, Gatekeeper Application 130 requests performance of the data operation at Datastore Server 106, and in response to receiving the request for performance of the data operation, Datastore Server 106 performs (648) the data operation.

Alternatively, when the constraint information is not (650) stored locally, Gatekeeper Application 130 requests the constraint information from Datastore Server 106. Datastore Server 106 retrieves (652) the constraint information and sends (654) the constraint information back to Gatekeeper Application 130. After receiving the constraint information, Gatekeeper Application 130 requests performance of the data operation at Datastore Server 106, and in response to receiving the request for performance of the data operation, Datastore Server 106 performs (648) the data operation. Optionally, after the data operation is performed, information corresponding to the data operation (e.g., a confirmation of data read/write) is sent back to Client 102 via Gatekeeper Application 130 and Untrusted Application 112.

It should be understood that the particular order in which the operations in FIG. 6 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 700 (described herein with respect to FIGS. 7A-7D) are also applicable in an analogous manner to method 600 described above with respect to FIGS. 6A-6B. For example, the entities, data structures (databases and indexes), constraints and operations described above with reference to method 600 may have one or more of the characteristics of the various entities, data structures (databases and indexes), constraints and operations described herein with reference to method 700. For brevity, those details are not repeated here.

Storing Information in a Trusted Environment

FIGS. 7A-7D include a flowchart representing a method 700 for processing a data request associated with a constraint-restricted portion of a schemaless database, according to certain embodiments. Method 700 is, optionally, governed by instructions that are stored in a non-transitory computer readable storage medium and that are executed by one or more processors of one or more servers (e.g., App Server 104 and/or Datastore Server 106, FIG. 4). Each of the operations shown in FIGS. 7A-7D typically corresponds to instructions stored in a computer memory or non-transitory computer readable storage medium (e.g., memory 306 of App Server 104 or memory 406 of Datastore Server 106 in FIG. 4). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted or executed by one or more processors. In various embodiments, some operations in method 700 may be combined and/or the order of some operations may be changed from the order shown in FIGS. 7A-7D.

In some embodiments, a respective server (e.g., App Server 104 or Datastore Server 106) generates (702) the first data request at the server system, where the first data request is generated by an instance of a first application. In other words, an untrusted application applies a set of predefined constraints to the first data request. For example, in FIG. 5B, "Master" Untrusted Application 122-B generates data requests in accordance with its interaction with a client application and data request processing constraints. Similarly, in FIG. 5A, Untrusted Application 122-A, Untrusted Application 122-B and Untrusted Application 122-C generate date requests based at least in part on predefined data request processing constraints, and the data requests are transmitted to Datastore Server 106 via corresponding Gatekeeper Applications. In some circumstances, the first data request is generated in response to a client-specified request from a client application associated with the first application (e.g., when the first application is a server-side application that provides back-end services to the client application).

Alternatively, in some embodiments, the respective server receives (704) the first data request from the first application. In some embodiments, the first application is an untrusted application executed by a sandboxed process on the server system. For example, in FIG. 5B, "Master" Untrusted Application 122-B receives data requests generated by Untrusted Application 122-A and Untrusted Application 122-C and processes the data requests in accordance with data request processing constraints. Similarly, in FIG. 5C, "Master" Gatekeeper Application 130-B receives data requests generated by Untrusted Application 122-A, Untrusted Application 122-B, and Untrusted Application 122-C and processes the data requests in accordance with data request processing constraints. As another example, in FIG. 5A, Untrusted Application 122-A, Untrusted Application 122-B, and Untrusted Application 122-C generate and transmit data requests to corresponding Gatekeeper Applications (e.g., Gatekeeper Application 130-A, Gatekeeper Application 130-B, and Gatekeeper Application 130-C, respectively) which process the data requests in accordance with data request processing constraints.

After the first data request has been obtained (e.g., received or generated) the respective server analyzes (706) the first data request associated with the first application (e.g., an Untrusted Application or a Gatekeeper Application), where the analyzing includes determining whether the first data request is associated with a constraint-restricted portion of a schemaless datastore (e.g., a constraint restricted portion of Entity Database 142). In some embodiments, data operations in the constraint-restricted portion are subject to a set of predefined constraints. In some embodiments, the constraint-restricted portion of a respective datastore is the portion of the datastore that is associated with a particular application (e.g., "Master" Untrusted Application 122-B in FIG. 5B or "Master" Gatekeeper Application 130-B in FIG. 5C). In some embodiments the constraint-restricted portion of the respective datastore is separated from other portions of the respective datastore by physical boundaries (e.g., the constraint-restricted portion of the respective datastore is on a separate hard drive disk from other portions of the respective datastore). In some embodiments the constraint-restricted portion of the respective datastore is separated from other portions of the respective datastore by logical boundaries (e.g., the constraint-restricted portion of the respective datastore corresponds to a portion of the datastore assigned to a particular application, user or domain and/or the constraint-restricted portion of the datastore corresponds to entities in the respective datastore that are labeled with an identifier of the constraint-restricted portion such as a user identifier, an application identifier, a domain identifier or another identifier specified by a user or application developer).

After analyzing the first data request, the respective server determines whether the first data request is associated with the constraint-restricted portion. In some embodiments determining whether the first data request is associated with the constraint-restricted portion includes determining whether one or more of the following conditions has been met: (1) Was the first data request received from an application associated with a predefined domain that is subject to the first set of constraints? (2) Is the first data request associated with an application that is subject to the first set of constraints? (3) Is the first data request a request to interact with data stored in the constraint-restricted portion? In some implementations, only one of these conditions is evaluated. In some implementations a combination of two or more of these conditions are evaluated to determine whether the first data request is associated with the constraint-restricted portion.

In circumstances where the first data request was (708) received from an application associated with a predefined domain that is subject to the first set of constraints (e.g., the first data request was received from a subordinate application); the first data request is (710) associated with an application that is subject to the first set of constraints (e.g., the first data request is associated with an identifier for the master application); and/or the first data request is (712) a request to interact with data stored in the constraint-restricted portion (e.g., the first data request adds deletes or modifies shared data associated with a "Master" application), the respective server determines that the first data request is (714) associated with the constraint-restricted portion.

In contrast, in circumstances where the first data request was not (716) received from an application associated with a predefined domain that is subject to the first set of constraints (e.g., the first data request was received from a subordinate application); the first data request is not (718) associated with an application that is subject to the first set of constraints (e.g., the first data request is associated with an identifier for the master application); and/or the first data request is not (720) a request to interact with data stored in the constraint-restricted portion (e.g., the first data request is adds/deletes/modifies shared data associated with a "Master" application), the respective server determines that the first data request is not (722) associated with the constraint-restricted portion.

In some embodiments, in accordance with a determination that the first data request is not (724) associated with the constraint-restricted portion, the respective server transmits (726) the request to the schemaless datastore without processing the first data request in accordance with the constraint information. In some embodiments, the first application is enabled to access data that is accessible to multiple applications and is stored in the constraint-restricted portion and is also enabled to access data (e.g., a "scratch disk") that is accessible only to the first application and is not subject to the predefined constraints (e.g., is subject to no constraints or is subject to application-specific constraints). For example, the App Server 104 stores a whitelist for application or user identifiers of applications or users that are allowed to modify data in a "scratch disk" for a respective application, and when an application identifier for the "Master" app is used for a data request, the first data request is subject to the predefined constraints, while when another application identifier (e.g., the application identifier for the respective application) is used, the first data request is not subject to the predefined constraints.

In accordance with a determination that the first data request is (728) associated with the constraint-restricted portion, the respective server retrieves (730) constraint information corresponding to the set of predefined constraints, where the constraint information enables the set of predefined constraints to be applied to the first data request prior to execution of the first data request (e.g., by the respective server system or another server system). In some embodiments, the constraint information enables (732) the set of predefined constraints to be applied to the first data request before the first data request is transmitted to the schemaless datastore for execution (e.g., the constraint information enables the predefined constraints to be applied at a master application, an application server associated with the master application or another process outside of the schemaless datastore such as "Master" Untrusted Application 122-B in FIG. 5B or "Master" Gatekeeper Application 130-B in FIG. 5C).

In some embodiments, enabling the set of predefined constraints to be applied includes (734) enabling a process applying the set of predefined constraints to determine whether the first data request complies with the constraints and, in accordance with a determination that at least a portion of the first data request does not comply with the constraints, the process forgoes execution of the portion of the first data request. In some embodiments, when a portion of the first data request is rejected (e.g., when the process forgoes executing the portion of the first data request), an error message is sent to the requesting application indicating that the portion of the first data request has been rejected. Alternatively, in some situations and/or in some implementations, the process forgoes execution of the entire first data request (e.g., the process forgoes applying a write operation when at least one portion of the write operation violates the constraints, so as to avoid applying partial write operations at Datastore Server 106).

In some embodiments, the constraints are applied (736) to the first data request by a process running at the respective server (e.g., a respective App Server that determined that the first data request is associated with the constraint-restricted portion, which already has the constraints cached in-memory, can apply the constraints). For example, as shown in FIG. 5B, Gatekeeper Application 130-B processes data requests generated by "Master" Untrusted Application 122-B. In some embodiments, the constraints are applied to the first data request by an untrusted process (738) running in a sandboxed environment in another server system. For example, as shown in FIG. 5B, "Master" Untrusted Application 122-B applies constraints to a data request generated by Untrusted Application 122-A.

In some embodiments, the constraints are applied to the first data request by a trusted process (740) running on another server system that is in communication with the schemaless datastore (e.g., a Gatekeeper Application 130 at a different App Server 104, which already has the constraints cached in-memory, can apply the constraints). For example, as shown in FIG. 5B, Gatekeeper Application 130-B applies constraints associated with requests generated from Untrusted Application 122-A and Untrusted Application 122-C, which are routed through "Master" Untrusted Application 122-B. As another example, in FIG. 5C, "Master" Gatekeeper Application 130-B applies constraints to data requests from Untrusted Application 122-A, Untrusted Application 122-B and Untrusted Application 122-C. In some embodiments, the constraints are applied to the first data request by a process (742) running at the schemaless datastore (e.g., Datastore Server 106 can apply the constraints provided that a Gatekeeper Application 130 passes the relevant constraints down to Datastore Server 106 along with the request). For example, as shown in FIG. 5B, "Master" Untrusted Application 122-B appends constraints to data requests generated by Untrusted Application 122-A and Untrusted Application 122-C and transmits the data requests with the constraints to Gatekeeper Application 130-B for transmission to Datastore Server 106. As another example, as shown in FIG. 5C, "Master" Gatekeeper Application 130-B appends constraints to data requests generated by Untrusted Application 122-A, Untrusted Application 122-B and Untrusted Application 122-C and transmits the data requests with the constraints to Datastore Server 106.

After retrieving the constraint information, the respective server processes (746) the first data request in accordance with the constraint information. In some embodiments, the constraint information includes the set of predefined constraints and processing the first data request includes applying (748) the set of predefined constraints to the first data request. In some embodiments, applying the constraints includes, determining whether the first data request complies with the constraints and in accordance with a determination that at least a portion of the first data request does not comply with the constraints, forgoing processing of the portion of the first data request in accordance with the constraint information. In other words, in some of these embodiments, the constraints are applied to a data request before the data request is sent to Datastore Server 106. In situations where constraints are applied to the data request in a sandboxed application (e.g., "Master" Untrusted Application 122-B in FIG. 5B), the constraints are permitted to include programmatic constraints which are not permitted to be executed in the trusted environment (e.g., due to the possibility of the programmatic constraints impairing operation of the respective server or Datastore Server 106 intentionally or unintentionally).

In some embodiments, the constraint information includes the set of predefined constraints and processing the first data request includes appending (750) the predefined constraints to the first data request. In some embodiments, the predefined constraints are retrieved from the schemaless datastore, where they are stored in high-latency memory (e.g., memory with a long access time such as a magnetic disk hard drive). In some implementations the respective server is App Server 104, which is associated with a subset of applications served by Datastore Server 106, and App Server 104 stores request-processing information for processing data requests associated with the subset of applications in low-latency memory (e.g., high speed random access memory, cache memory associated with a magnetic disk hard drive, or flash memory used in place of a magnetic disk hard drive), this request processing information optionally includes the set of predefined constraints. Because App Server 104 is associated with the subset of applications, the request-processing information can be stored in low-latency memory at App Server 104 which would not be able to store request-processing information for all, or a substantially larger subset, of the applications served by Datastore Server 106.

In some embodiments, the constraint information includes a gatekeeper identifier for a gatekeeper process associated with the set of predefined constraints and processing the first data request includes redirecting (752) the request to the gatekeeper process. For example, the constraint information includes an identifier for a first gatekeeper process ("Master" Untrusted Application 122-B in FIG. 5B) for processing programmatic constraints or declarative constraints and/or an identifier for a second gatekeeper process (Gatekeeper Application 130-B in FIG. 5B) for processing declarative constraints.

In some embodiments, the gatekeeper process is (754) an untrusted process running in a sandboxed environment in another server system (e.g., from the perspective of Untrusted Application 122-A, "Master" Untrusted Application 122-B in FIG. 5B is an untrusted process running in a sandboxed environment in another server system). In some of these embodiments, the gatekeeper process is authorized to execute arbitrary code within the sandboxed environment, and the gatekeeper process is in communication with a trusted process (e.g., Gatekeeper Application 130-B in FIG. 5B) that has privileges to transmit data requests to the constraint-restricted portion of the schemaless datastore. In other words, the first data request is transmitted to a master application that is capable of enforcing both declarative constraints and programmatic (e.g., non-declarative) constraints. In some circumstances and/or implementations, the sandboxed environment prevents the untrusted process from transmitting data requests to the constraint-restricted portion of the schemaless datastore.

In some embodiments, the gatekeeper process is (756) a trusted process running on another server system (e.g., from the perspective of Untrusted Application 122-A, "Master" Gatekeeper Application 130-B in FIG. 5C is a trusted process running in a sandboxed environment in another server system). In some of these embodiments, the gatekeeper process has access to the set of predefined constraints, and the gatekeeper process has privileges to transmit data requests to the constraint-restricted portion of the schemaless datastore. In some embodiments, the gatekeeper process is prohibited from executing code from untrusted sources, and thus is not able to enforce programmatic (e.g., non-declarative) constraints. In some embodiments, the respective server (e.g., the server on which Untrusted Application 122-A is running) does not have direct access to the set of predefined constraints and thus, instead of applying the predefined constraints, the respective server system redirects the data requests to another server system that does have direct access to the set of predefined constraints. In some embodiments, the first application is (758) one of a plurality of subordinate applications associated with a master application (e.g., "Master" Untrusted Application 122-B in FIG. 5B or "Master" Gatekeeper Application 130-B in FIG. 5C), where the master application is associated with the constraint-restricted portion and processing the first data request includes: retrieving an identifier for the master application and appending the identifier for the master application to the first data request before the first data request is transmitted to the schemaless datastore.

In some embodiments, the respective server analyzes (760) a second data request associated with a second application. In some implementations, the first application and the second application are both associated with a same administrative domain and the set of predefined constraints are specified by (762) an administrator of the administrative domain prior to processing the first data request and the second data request. Thus, in some implementations, newly created applications in the domain associated with a master application will automatically be subject to constraints associated with the master application. In some embodiments, the analyzing includes determining whether the second data request is associated with the constraint-restricted portion. For example, in FIG. 5B, Untrusted Application 122-A and Untrusted Application 122-C would both be associated with a domain associated with "Master" Untrusted Application 122-B, so that data requests from all three of these applications are routed through "Master" Untrusted Application 122-B and Gatekeeper Application 130-B. As another example, in FIG. 5C, Untrusted Application 122-A, Untrusted Application 122-B and Untrusted Application 122-C are associated with a domain associated with "Master" Gatekeeper Application 130-B, so that data requests from all three of these applications are routed through "Master" Gatekeeper Application 130-B.

In some embodiments where the respective server analyzes a second data request associated with a second application, in accordance with a determination that the second data request is (764) associated with the constraint-restricted portion (e.g., the same constraint restricted portion of the schemaless database as the portion associated with the first data request) the respective server retrieves (766) constraint information corresponding to the set of predefined constraints and the respective server processes (768) the second data request in accordance with the constraint information. In other words, in some embodiments, the master application (e.g., "Master" Untrusted Application 122-B in FIG. 5B or "Master" Gatekeeper Application 130-B in FIG. 5C) receives requests from a plurality of different applications in a domain and processes all of the requests in the same way (e.g., by processing the data request based on the predefined constraints or appending a master app ID and/or a representation of the predefined constraints to the data request). In contrast, in some implementations, in accordance with a determination that the second data request is not (770) associated with the constraint-restricted portion, the respective sever transmits (772) the request to the schemaless datastore without processing the second data request in accordance with the constraint information. In some embodiments, after processing a respective data request (e.g., the first data request or the second data request), Datastore Server generates results and sends the results back to the respective server (e.g., Gatekeeper Application 130-B) for transmission back to Client 102.

It should be understood that the particular order in which the operations in FIGS. 7A-7D have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 600 (described herein with respect to FIGS. 6A-6B) are also applicable in an analogous manner to method 700 described above with respect to FIGS. 7A-7D. For example, the entities, data structures (databases and indexes), constraints and operations described above with reference to method 700 may have one or more of the characteristics of the various entities, data structures (databases and indexes), constraints and operations described herein with reference to method 600. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
  at a respective server system having one or more processors and memory storing one or more programs that when executed by the one or more processors cause the respective server system to perform the method, the method comprising:
    analyzing a first data request associated with a first application, wherein the analyzing includes determining whether the first data request is associated with a constraint-restricted portion of a schemaless datastore, wherein data operations in the constraint-restricted portion are subject to a set of predefined constraints; and
    in accordance with a determination that the first data request is associated with the constraint-restricted portion:
      retrieving constraint information corresponding to the set of predefined constraints; and
      applying the set of predefined constraints to the first data request prior to execution of the first data request, including:
        in accordance with a determination that a first portion of the first data request complies with the set of predefined constraints, processing the first portion of the first data request in accordance with the constraint information; and in accordance with a determination that a second portion of the first data request does not comply with the set of predefined constraints, forgoing processing the second portion of the first data request.

2. The method of claim 1, including applying the set of predefined constraints to the first data request before the first data request is transmitted to the schemaless datastore for execution.

3. The method of claim 1, further comprising, prior to analyzing the first data request, generating the first data request at the server system wherein the first data request is generated by an instance of the first application.

4. The method of claim 1, further comprising, prior to analyzing the first data request, receiving the first data request from the first application.

5. The method of claim 1, wherein:
the constraint information includes the set of predefined constraints; and
processing the first portion of the first data request includes applying the set of predefined constraints to the first portion of the first data request.

6. The method of claim 1, wherein:
the constraint information includes the set of predefined constraints; and
processing the first portion of the first data request includes appending the predefined constraints to the first portion of the first data request.

7. The method of claim 1, wherein:
the constraint information includes a gatekeeper identifier for a gatekeeper process associated with the set of predefined constraints; and
processing the first portion of the first data request includes redirecting the first portion of the first data request to the gatekeeper process.

8. The method of claim 7, wherein:
the gatekeeper process is an untrusted process running in a sandboxed environment in another server system;
the gatekeeper process is authorized to execute arbitrary code within the sandboxed environment; and
the gatekeeper process is in communication with a trusted process that has privileges to transmit data requests to the constraint-restricted portion of the schemaless datastore.

9. The method of claim 7, wherein:
the gatekeeper process is a trusted process running on another server system;
the gatekeeper process has access to the set of predefined constraints; and
the gatekeeper process has privileges to transmit data requests to the constraint-restricted portion of the schemaless datastore.

10. The method of claim 1, wherein:
the first application is one of a plurality of subordinate applications associated with a master application, wherein the master application is associated with the constraint-restricted portion; and
processing the first portion of the first data request includes:
retrieving an identifier for the master application; and
appending the identifier for the master application to the first portion of the first data request before the first data request is transmitted to the schemaless datastore.

11. The method of claim 1, further comprising:
analyzing a second data request associated with a second application, wherein the analyzing includes determining whether the second data request is associated with the constraint-restricted portion; and
in accordance with a determination that the second data request is associated with the constraint-restricted portion:
retrieving constraint information corresponding to the set of predefined constraints; and
processing the second data request in accordance with the constraint information.

12. The method of claim 11, wherein
the first application and the second application are both associated with a same administrative domain; and
the set of predefined constraints are specified by an administrator of the administrative domain prior to processing the first portion of the first data request and the second data request.

13. The method of claim 1, further comprising, in accordance with a determination that the first data request is not associated with the constraint-restricted portion of the schemaless datastore, processing the first data request without regard to the constraint information.

14. The method of claim 1, wherein the constraints are applied to the first data request by a process selected from a set consisting of:
a process running at the server system;
an untrusted process running in a sandboxed environment in another server system;
a trusted process running on another server system that is in communication with the schemaless datastore; and
a process running at the schemaless datastore.

15. The method of claim 1, wherein the determination that the first data request is associated with the constraint-restricted portion is based on a determination that:
the first data request was received from an application associated with a predefined domain that is subject to the first set of constraints;
the first data request is associated with an application that is subject to the first set of constraints; or
the first data request is a request to interact with data stored in the constraint-restricted portion.

16. A server system, comprising:
one or more processors;
memory; and
one or more programs, wherein the one or more programs are stored in the memory and configured to be executed by the one or more processors, the one or more programs including instructions for:
analyzing a first data request associated with a first application, wherein the analyzing includes determining whether the first data request is associated with a constraint-restricted portion of a schemaless datastore, wherein data operations in the constraint-restricted portion are subject to a set of predefined constraints; and
in accordance with a determination that the first data request is associated with the constraint-restricted portion:
retrieving constraint information corresponding to the set of predefined constraints; and
applying the set of predefined constraints to the first data request prior to execution of the first data request, including:
in accordance with a determination that a first portion of the first data request complies with the set of predefined constraints, processing the first portion of the first data request in accordance with the constraint information; and in accordance with a determination that a second portion of the first data request does not comply with the set of predefined constraints, forgoing processing the second portion of the first data request.

17. The system of claim 16, wherein the one or more programs, when executed by the one or more processors, cause the server system to apply the set of predefined constraints to the first data request before the first data request is transmitted to the schemaless datastore for execution.

18. A non-transitory computer readable storage medium storing one or more programs, the one or more programs comprising instructions, which when executed by a computer system with one or more processors, cause the computer system to:

analyze a first data request associated with a first application, wherein the analyzing includes determining whether the first data request is associated with a constraint-restricted portion of a schemaless datastore, wherein data operations in the constraint-restricted portion are subject to a set of predefined constraints; and in accordance with a determination that the first data request is associated with the constraint-restricted portion:

retrieve constraint information corresponding to the set of predefined constraints; and apply the set of predefined constraints to the first data request prior to execution of the first data request, including:

in accordance with a determination that a first portion of the first data request complies with the set of predefined constraints, processing the first portion of the first data request in accordance with the constraint information; and in accordance with a determination that a second portion of the first data request does not comply with the set of predefined constraints, forgoing processing the second portion of the first data request.

19. The non-transitory computer readable storage medium of claim 18, wherein the one or more programs, when executed by the one or more processors, cause the computer system to apply the set of predefined constraints to the first data request before the first data request is transmitted to the schemaless datastore for execution.

* * * * *